United States Patent [19]
Klein

[11] Patent Number: 5,453,194
[45] Date of Patent: Sep. 26, 1995

[54] BACK-FLUSHING FILTER DEVICE FOR THE FILTRATION OF HIGHLY VISCOUS LIQUIDS

[75] Inventor: Walter Klein, Lenzing, Austria

[73] Assignee: Lenzing Aktiengesellschaft, Lenzing, Austria

[21] Appl. No.: 66,529

[22] Filed: May 24, 1993

[30] Foreign Application Priority Data

May 27, 1992 [AT] Austria ................................. 1102/92

[51] Int. Cl.⁶ ................................................... B01D 35/00
[52] U.S. Cl. ........................... 210/411; 210/412; 210/415
[58] Field of Search ................................. 210/412, 411, 210/415, 108; 425/197, 199

[56] References Cited

U.S. PATENT DOCUMENTS

| | | | |
|---|---|---|---|
| 3,574,509 | 4/1971 | Zentis et al. | 210/107 |
| 4,332,541 | 6/1982 | Anders | 425/197 |
| 4,734,188 | 3/1988 | Burdetta, Jr. et al. | 210/323.2 |
| 4,849,113 | 7/1989 | Hills | 210/106 |
| 4,935,126 | 6/1990 | Drori | 210/411 |
| 5,047,148 | 9/1991 | Arai | 210/498 |
| 5,128,029 | 7/1992 | Herrmann | 210/107 |
| 5,200,077 | 4/1993 | McNiece | 210/323.2 |
| 5,240,605 | 8/1993 | Winzeler | 210/433.1 |
| 5,308,484 | 5/1994 | Bacher et al. | 210/411 |

FOREIGN PATENT DOCUMENTS

| | | | |
|---|---|---|---|
| 270501 | 10/1987 | European Pat. Off. | |
| 305606 | 3/1989 | European Pat. Off. | |
| 305575 | 3/1989 | European Pat. Off. | |
| 411163 | 2/1991 | European Pat. Off. | |
| 3033056 | 5/1981 | Germany | |
| 2947685 | 7/1981 | Germany | |
| 3705803 | 9/1987 | Germany | |
| 69045 | 4/1992 | Germany | |
| 0366694 | 5/1992 | Germany | 210/411 |
| 8703213 | 6/1987 | WIPO | 210/411 |

*Primary Examiner*—Virginia Manoharan
*Attorney, Agent, or Firm*—Brumbaugh, Graves, Donohue & Raymond

[57] ABSTRACT

Back-flushing filter device for the filtration of a highly viscous liquid with a housing (1) which has an inlet port (2) for the liquid to be filtered, a filter (3) and an outlet port (4) for filtrate, characterised in that,

- the filter (3) contacts, on its side facing the liquid to be filtered, a separating body (5) with recesses ("reject spaces") (6),
- the separating body (5) has inlet channels (7) for the liquid to be filtered, whereby the inlet channels run into the recesses (6),
- the separating body (5) has an outlet device (8, 8', 8") for the back-flushed liquid which is spatially separated from inlet channels (7),
- the housing (1) has a drain (9) for the back-flushed liquid, and that
- the entry port (2) and drain (9) are designed to be closable.

8 Claims, 4 Drawing Sheets

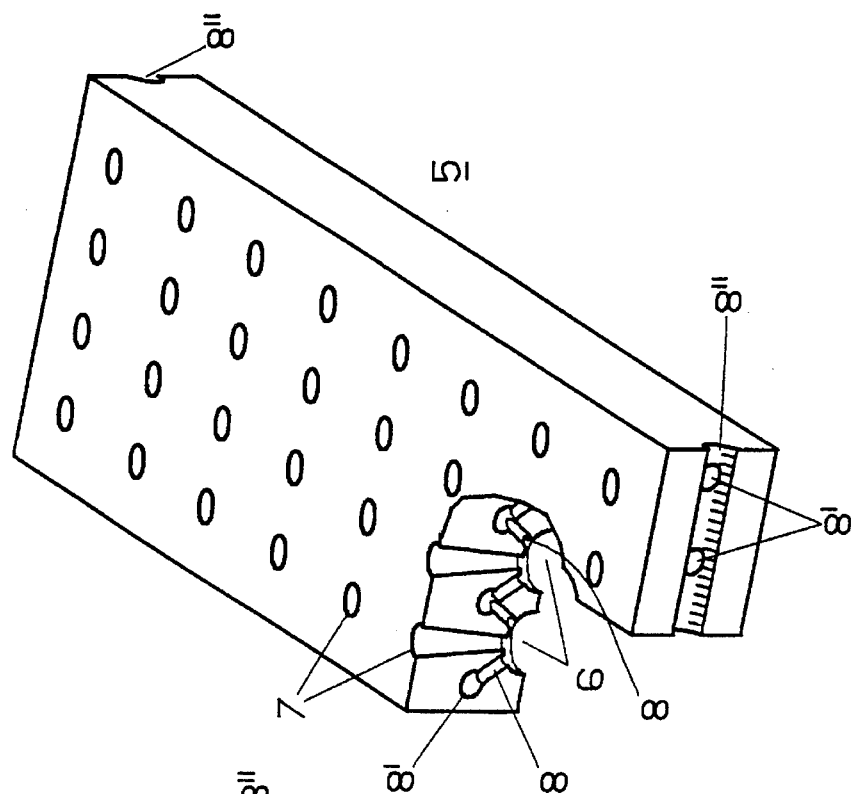
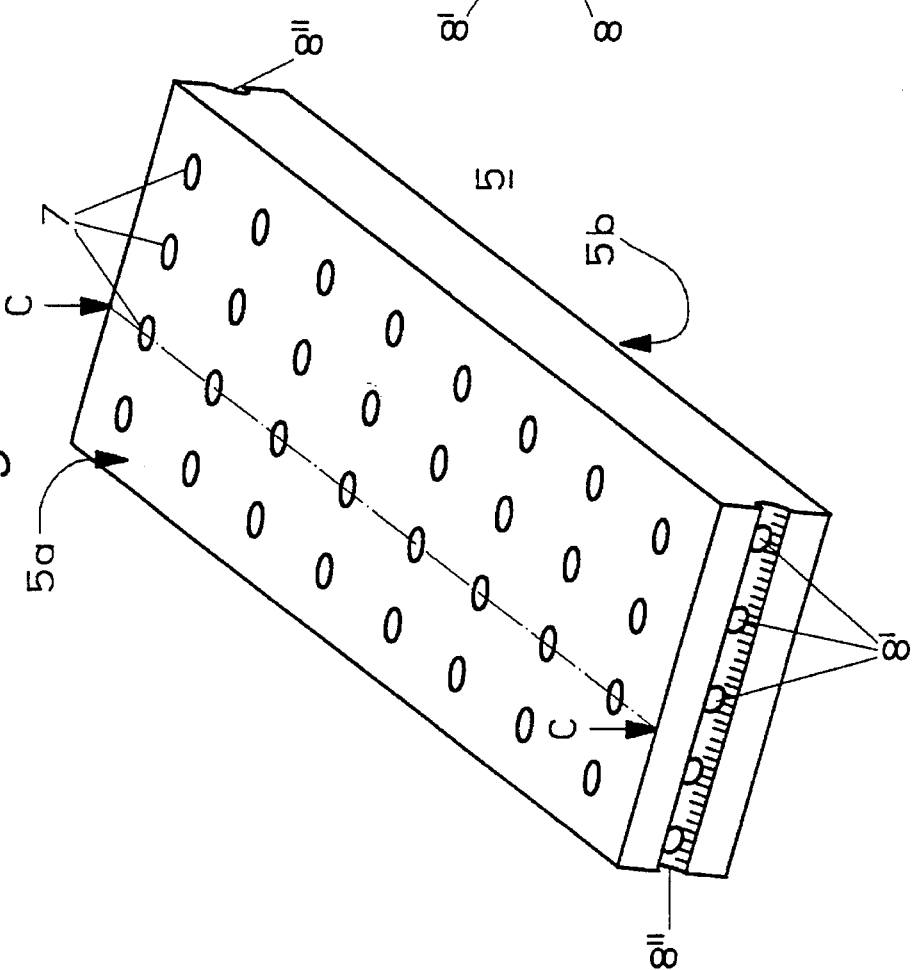

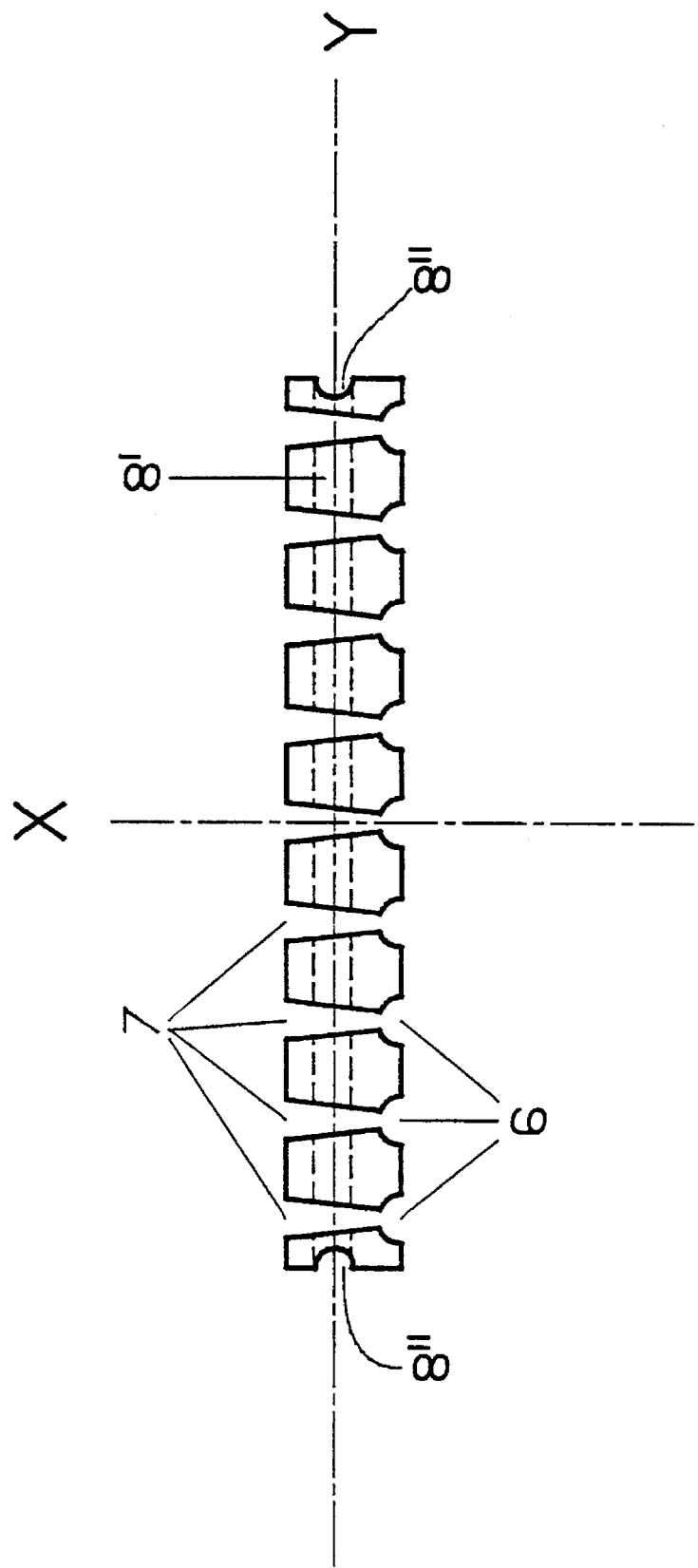

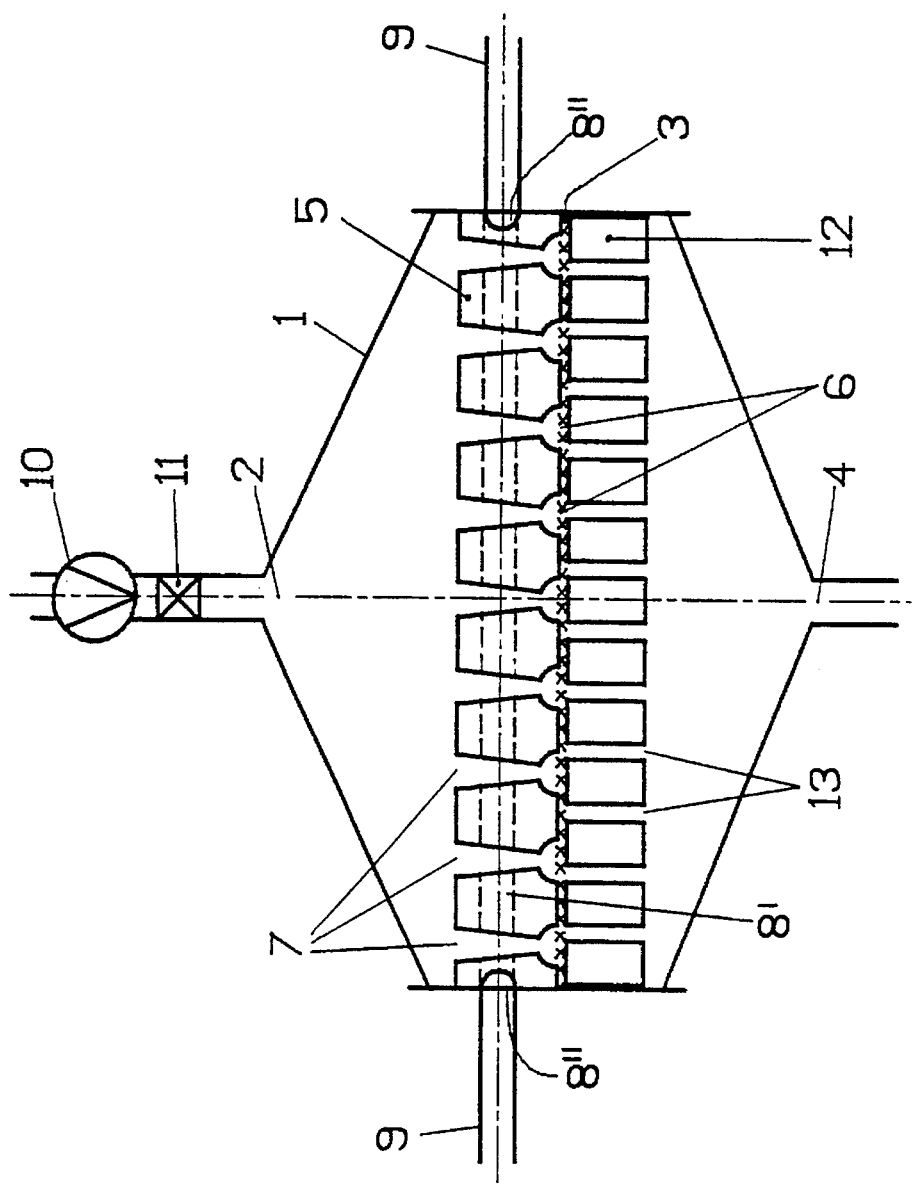

BACK-FLUSHING FILTER DEVICE FOR THE FILTRATION OF HIGHLY VISCOUS LIQUIDS

The invention concerns a filter device which can be back-flushed for the filtration of a highly viscous liquid, with a housing which contains an inlet port for the liquid to be filtered, a filter and an outlet port for the filtrate.

A variety of filtration devices capable of being back-flushed are known from the literature. A controllable filter for the filtration of a liquid is described in U.S. Pat. No. 3,574,509. The filter element consists of two concentric perforated cylinders supporting a very fine wire mesh which is located between them, whereby this construction is supported in a cavity. A back-flushing arm rotates about an axis in the centre of the filter element. The back-flushing arm has a slit defined by mouldings which form a seal by rubbing against the inner periphery of the filter element. The residue collected during the filtration is back-flushed through the slit in the arm.

A filtration device which can be back-flushed is known from EP-A 0 305 606, whereby a corrugated arrangement is incorporated into the upper holding space of a filter reservoir, so that with a partly opened water-slurry flap it prevents any direct outflow of the slurried granular filter material into the water-slurry outlet, thus preventing loss of filter material.

The back-flushing filter according to DE-A 3 705 803 has a filter chamber in which a cylindrical filter insert is located, where the medium to be filtered flows through the filter insert from the inside to the outside. This filter insert has an inner cage, in whose cylindrical wall are slit-shaped windows which extend in a substantially horizontal direction and which are separated from one another by webs, and in whose interior is arranged an axially movable scraper to remove filter residues.

EP-A 0 411 163 describes a filter device with continuous cleaning of the filter surface. The device contains a cylindrical housing with an inlet port and an outlet port. The filter element is a sleeve with a lateral filtration face and with an inner cavity. A scraper element is coupled to an actuator and is mounted in an annulus formed between the inner surface of the housing and the outer filtration surface of the sleeve. The scraper element is designed as at least one spiral strip, which surrounds the sleeve and which acts upon the filtration surface of the same.

A filtration apparatus which can be back-flushed and which has mechanical removal of the filter cake is also known from EP-A 0 305 575.

The invention has the objective of making available a filtration device which is fully capable of being back-flushed without using mechanical aids in the back-flushing operation, ie, without any moving parts such as scrapers or back-flushing arms, and where the filter residue can be removed from the filter almost completely. The cited mechanical back-flushing aids are subject to wear, necessitating replacement of the parts involved. Mechanical moving parts also tend to need repairing. Both of these features result in a need for the filtration devices to be disassembled, or at least their interiors to be handled. These operating procedures are particularly costly when a highly viscous liquid is being filtered. Should in addition this medium be damaging to health, then special safety precautions are necessary which make the repair even more costly.

The back-flushing filtration device according to the invention for filtering a highly viscous liquid has a housing which contains an inlet port for the liquid to be filtered, a filter and an outlet port for the filtrate, and is characterised in that, the filter, on its side in contact with the liquid to be filtered, contacts a separating body with recesses ("reject spaces");

the separating body has inlet channels for the liquid to be filtered, where the inlet channels run into the recesses;

the separating body has an outlet device for the back-flushed liquid which is spatially separated from the inlet channels;

the housing has a drain for the back-flushed liquid, and the entry port and the drain are designed to be closable.

The separating body has the function of largely separating the liquid to be filtered from the back-flushed liquid. During back-flushing, the residue removed from the filter ("reject") firstly gets into the recesses which are designated as "reject spaces" because of their function, and then via the outlet device which is spatially separated from the inlet channels to a drain which is best located at the filter housing. Channels, which lead from the reject spaces through the separating body to the drain, can also be provided as an outlet device. Also conceivable as an outlet device is a system of grooves which extend along the surface of the separating body on the side against the filter and which thus carry away sideways the back-flushed liquid to the outside.

It has also been shown that the filtration device according to the invention can be fully back-flushed, ie, the residue deposited in the filter can be removed again from the filter practically in its entirety and flushed out by back-flushing with the filtrate, provided that the back-flushing liquid has a viscosity of at least 0.4 Pa.s. The filter device according to the invention functions without any moving parts on account of the separating body. Control of the filtration and back-flushing processes occurs entirely by the use of pumps and shut-off devices. Moreover, no mechanism for driving the filter is necessary.

The filter device according to the invention is especially suitable for the filtration of highly viscous cellulose solutions, polyacrylate solutions, polyester solutions and also for the filtration of highly viscous, aggressive, abrasive and health-threatening solutions (since it is fully enclosed and can be used as a so-called "inline filter device"). The device according to the invention needs no dynamic seal on the outside.

The filter device according to the invention also allows internal flushing with chemical solvents.

The effect according to the invention is independent of the filter material used, whereby the appropriate filter can be used each time for the liquid being filtered. Limitation to certain filter materials is not therefore necessary. Possible filter materials are for example metal-fibre non-woven material, sintered woven material, combinations of metal-fibre non-woven material with sintered woven material, and plastic mesh woven material.

The geometric shape of the reject spaces is also largely unimportant in achieving the effect. It is obvious however that the reject spaces should be shaped so that regions having a low flow velocity are avoided. In the back-flushing process, the residues removed from the filter by the back-flushing liquid are carried away from such sites only with difficulty or only partially. In contrast, hemi-spherical, dome-shaped or grooved reject spaces are well suited, wherein the inlet channels advantageously run into the deepest point of the reject space. The radius of the reject spaces must naturally be matched to the filter material and to the pressures prevailing at the filter during back-flushing, in order to support the filter mechanically so that it does not tear apart. Mechanical support naturally also has to be provided at the side of the filter facing the outlet port, in order to avoid the deformation or tearing apart of the filter due to the high pressures necessary for filtration. The filtrate plate which is further described below, which has channels passing through it for the passage of the filtrate, is an example of just such a support.

The reject spaces should be designed small for economic reasons, so that the residues can be flushed out with the smallest possible amount of liquid. Accurately defined reject spaces moreover also allow an exactly controllable amount of reject without any change in the amount.

A preferred embodiment of the filtration device according to the invention consists of the outlet device being designed as a system of channels with outlet channels and collection channels.

Efficient removal of the back-flushed liquid from the reject spaces is achieved in this embodiment. The outlet channels are short channels which connect the reject spaces with the longer collection channels. The outlet channels desirably have a smaller diameter than the collection channels. The small diameter together with the high viscosity of the liquid prevents residue—which has been removed from the filter by one back-flushing process and which is still situated in the outlet channels or in the collection channels—from getting back again into the reject spaces and thus onto the filter again during the subsequent filtration. It is furthermore desirable that the inlet channels are designed with a taper at their junctions with the recesses.

The invention also concerns a separating body for use in the filter device according to the invention, which is designed as a plate ("separating plate") and which is further characterised by the axes of the Inlet channels and the collection channels being substantially at right angles to one another;

the recesses being arranged as hemi-spherical, dome-shaped or as grooves;

the junctions of the inlet channels being provided at the deepest points of the recesses, and there being at least two exit channels from each recess leading to collection channels.

The separating plate enables all the functions which are necessary for the charging and the back-flushing of the filter material to be carried out. It has been shown that the pressure loss in the separating plate is negligibly small compared to the pressure loss in the filter material.

A preferred embodiment of this separating plate consists of the inlet channels being tapered at the junctions and the outlet channels having a smaller diameter than the collection channels.

If the reject spaces of the separating plate according to the invention are provided in the form of grooves, then it has proved to be desirable to implement the grooves with a width between 1 and 5 mm and to arrange them parallel.

The separating plate is preferably provided with 15,000 to 25,000 inlet channels and with 30,000 to 40,000 outlet channels per square meter.

Designing the separating body as a plate opens up the possibility of arranging several filters one above another in one housing, and thereby increasing the filter area.

Such a variant of the filtration device according to the invention consists of two separating plates each of which is provided with an adjacent filter, whereby the sides of the separating plates which carry the filters are turned to face one another, and that a filtrate plate is provided between the separating plates to support the filters and to lead the filtrate away.

In general any plate-shaped body is suitable as a filter plate, providing that it has sufficient flexural strength to support the filter during the filtration process and has channels to lead the filtrate away. In the embodiment described, since the filtrate penetrates into the filter plate via channels not only through the upper side but also through the underside, then it is expedient to provide longitudinal channels (ie, in the form of drillings) in the interior of the filtrate plate which run parallel to the upperside and underside of the filter plate and which are connected to the connecting channels from the upperside and the underside, so that this filtrate may be collected and led away to the side. The dimensions of the filter plate, ie, its thickness, the number of channels, etc, can be matched to any given application.

In order to avoid unwanted mixing of individual fluid media, the inlet of liquid to be filtered, the outlet of filtrate and the outlet of back-flushed liquid must naturally be spatially separated from one another, which can be provided in simple fashion by an expert.

The separating plates can be covered on the outside by inlet plates which also have channels, through which the liquid to be filtered is introduced or dispersed into the inlet channels of the separating plates.

A further advantageous embodiment of the filtration device according to the invention is constructed from several filter units in the form of a sandwich, whereby one filter unit consists of an inlet plate and two separating plates each with a filter which are separated from one another by a filtrate plate.

For the easy cleaning of individual filter devices, it has proved to be effective to filter not with just a single device but with a filter system consisting of several filter devices which are connected in parallel.

BRIEF DESCRIPTION OF THE DRAWINGS

FIG. 1(a) is a perspective view of a plate-shaped separating body in accordance with the invention. FIG. 1(b) illustrates the separating body of FIG. 1(a) with a section of the separating plate removed, FIG. 1(c) illustrates a sectional view of the separating plate along line c—c in FIG. 1(a);

FIG. 2 is a sectional view of a filter device incorporating a separating body in accordance with the invention;

Figure 3:
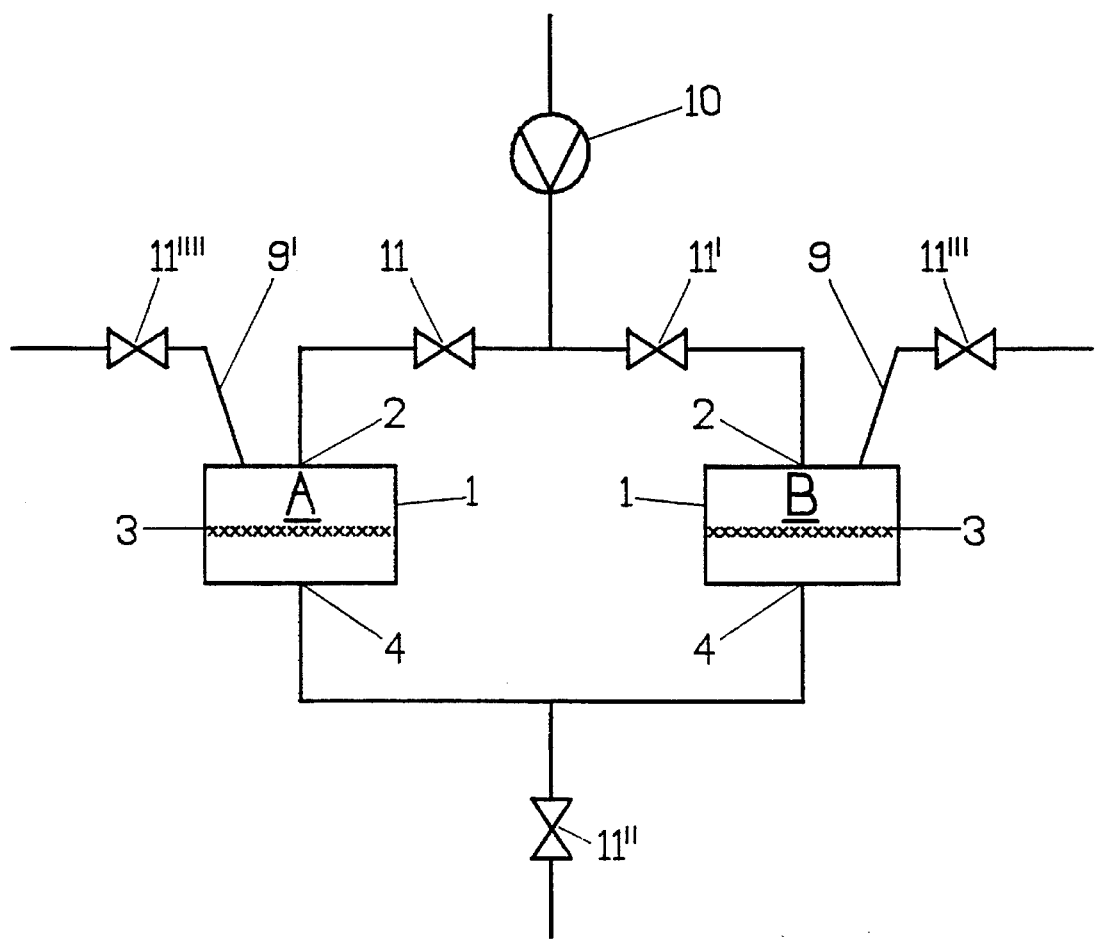
FIG. 3 is a schematic representation of a filter system including two filter devices connected in parallel in accordance with the invention.

The invention is further explained in the following by means of the Drawing which in FIG. 1 shows a plate-shaped design for the separating body 5 and which in FIG. 2 shows a simple design for the filter device. The operating procedure of a filter system, which consists of two filter devices connected in parallel, is shown in FIG. 3.

FIG. 1(a) is a schematic representation in perspective of the separating body 5 designed as a plate. The reference character 7 stands for the inlet channels through which the liquid to be filtered is forced into the recesses ("reject spaces") 6 and then through the filter (not shown). That side of the separating plate 5 which faces the liquid to be filtered is designated 5a. The reject spaces 6 are located at the underside 5b of the separating plate 5. The collection channels 8' run through the entire separating plate 5 parallel to one another and parallel to the upperside and underside 5a and 5b respectively. The two collection channels 8", which collect the back-flushed liquid flowing out from the collection channels 8' during the back-flushing process, do not necessarily have to extend over the whole width of the separating plate. The underside 5b—and thus the recesses 6—are covered by the filter (not shown). The separating plate 5 according to the invention can have further collection channels (not shown) in its interior, which carry away to the outside the back-flushed liquid from the outlet channels 8 in a direction other than that shown in FIG. 1b.

In order to give a better understanding of the channel system in the interior of the separating plate, FIG. 1b once again shows the separating plate according to FIG. 1a but where a section has been cut out. The reject spaces 6 executed in a hemi-spherical design can be seen. The inlet channels 7 are tapered as they merge into the reject spaces 6. The diameter of the inlet channels preferably amounts to between 1 and 6 mm. The diameter of the outlet channels 8 and the collection channels 8' are preferably between 1 and 5 mm, or 4 and 10 mm respectively. The liquid back-flushed through the filter into the reject spaces 6 flows from the reject spaces 6 through the outlet channels 8 and into the collection channels 8' and 8". The separating plate 5 shown has two collection channels 8" which are situated at the two opposing sides of the separating plate 5.

FIG. 1c shows a section of the separating plate 5 along the line c—c in FIG. 1a. In this representation, merely the collection channels 8" of the outlet arrangement for the back-flushed liquid are shown. The collection channels 8' are indicated by broken lines; the outlet channels 8 are not visible in this representation. The axes of the inlet channels 7 and the collection channels 8' are indicated by x and y; in the embodiment of the separating plate shown, the axes x and y are at right angles to one another.

The dimensions of the separating plate depend on the pressure level in the interior of the filter. In the case where the reject spaces have been designed in the form of grooves with a groove width of 4 mm (and a distance between adjacent grooves of 1 mm) and with a separating plate size of about 250×1000 mm (the area available for the filter), there is a free filter area of about 0.2 m². The separating plate can be additionally supported by a stay or by a supporting point in the middle of the plate. In the following there is given some typical data for the embodiment of the separating plate represented in FIG. 1a, which is especially suitable for use in a filtration device for the filtration of highly viscous, spinnable cellulose solutions (for example, NMMO solutions):

| | |
|---|---|
| Length: | 1,000 mm |
| Width: | 350 mm |
| Thickness: | 10–20 mm |
| Material (example): | steel, plastic, aluminium |
| No. of inlet channels (7): | 4,100 |
| Diameter upper/lower: | 2–5 mm/1–3 mm |
| No. of outlet channels (8): | 8,000–9,000 |
| Diameter: | 1–3 mm |
| No. of collection channels (8'): | 80–90 |
| Diameter: | 4–6 mm |
| No. of collection channels (8"): | 2 |
| Diameter: | 6–10 mm |
| Diameter of dome-shaped reject spaces: | 2–4 mm |

FIG. 2 shows a section through a filter device according to the invention in a simple embodiment, wherein that separating plate 5 described in FIG. 1 is provided. The housing of the device is designated 1, whilst 2 and 4 stand for the inlet and outlet ports respectively. The filter 3 lays flat against the separating plate 5 and on the side which has the reject spaces 6.

The filter device represented in FIG. 2 functions as follows:

The high viscosity liquid to be filtered is conveyed under pressure by means of a booster pump 10, with valve 11 open and with drain 9 closed (closure not shown), through the inlet port 2 to the separating plate 5. The separating plate 5 shown in FIG. 2 is a section along the line c—c in FIG. 1a. The liquid penetrates through the inlet channels 7 into the reject spaces 6 and is forced through the filter whilst the substance to be filtered off (residue) is deposited. The filtrate passes through a filtrate plate 12 which has filtrate channels and which supports the filter 3, and thence to the outlet port 4 where it can be collected.

In order to back-flush, valve 11 is firstly closed, the drain 9 is opened and the filtrate is forced under pressure (pressure generation not shown) through the outlet port 4 and the filtrate plate 12 and through the filter 3, whereby the residues which have been filtered off are removed. The residue which has collected in the reject spaces 6 is then flushed out through the outlet channels 8 (not visible in FIG. 2, but shown in FIG. 1b) and into the collection channels 8' and 8" and can be removed through the drain 9 in the filter device.

In FIG. 2, only the constructional features of the filtration device necessary for an understanding the invention were shown. It is for example obvious that suitable fixing devices for the individual plates must be provided and that the plates must be sealed against one another to avoid any unwanted mixing of the individual liquids.

FIG. 3 shows a variant of the filter system according to the invention, consisting of two filter devices A and B according to the invention, each having filters 3 of equal size and being connected in parallel. The filter devices are shown only schematically since their operating procedure has already been explained by means of FIGS. 1 and 2. The reference letters A and B stand for each of the two embodiments described.

Using the booster pump 10 and with valves 11 and 11' open, both filter units are firstly charged with the liquid to be filtered. For filtration, valve 11" is open whilst the drain valves 11'" and 11"" are closed. During filtration a pressure difference is built up between inlet port 2 and outlet port 4.

In order to back-flush the filter device B, valves 11' and 11" are closed and the drain valve 11'" is opened. Filtrate from the filter device A then flows in the inverse direction through the filter device B and thereby flushes free the filter 3 located in B, The filtrate loaded with residue is forced out from the filter device B through the open drain 9.

In order to back-flush the filter device A, valves 11 and 11" are closed and the drain valve 11"" is opened. Filtrate from the filter device B then flows in the inverse direction through the filter device A and thereby flushes free the filter 3 located in A. The filtrate loaded with residue is forced out from the filter device A through the open drain 9'.

The filtrate conveying capacity which is necessary for the back-flushing operation can be adjusted conveniently by means of the booster pump 10 and thus the conditions can be exactly met each time. By increasing the r.p.m. of the pump 10, a higher back-flushing capacity can be set whereby better cleaning of the filter is achieved.

In accordance with the invention, several filter devices can also be connected together in parallel to give one filtration system, whereby still higher back-flushing capacity can be achieved.

I claim:

1. At least one back-flushable apparatus for the filtration of a high viscosity liquid comprising a housing which has an inlet for the liquid to be filtered, a filter comprising at least one filter unit, an outlet port for filtrate, and a drain for back-flushed liquid and means for closing the inlet and drain, wherein the filter contacts a separating body on a side of the filter facing the liquid to be filtered, the separating body comprising recesses forming reject spaces, inlet channels for the liquid to be filtered and an outlet device for back-flushed liquid, the outlet device formed as a system of channels with outlet channels and collection channels, said inlet channels contiguous with the recesses and said outlet device spatially separated from the inlet channels, wherein the separating body is a separating plate in which x and y axes of the inlet channels and of the collection channels are substantially at right angles to one another, the recesses have a shape selected from the group consisting of hemi-spherical, dome, and groove, the inlet channels are contiguous with the deepest portion of the recess thereby forming a junction between the inlet channels and the recess, and at least two outlet channels are contiguous with each recess and collection channels.

2. Apparatus according to claim 1 wherein the inlet channels of the separating plate taper at the junctions and the diameter of the outlet channels is smaller than that of collection channels.

3. Apparatus according to claim 1 or claim 2 wherein the separating plate comprises from 15,000 to 25,000 inlet channels and from 30,000 to 40,000 outlet channels per square meter.

4. Apparatus according to claim 1 or claim 2 wherein the recesses in said separating plate are arranged in parallel and have a groove shape and wherein the recesses are from 1 to 5 mm in width.

5. Apparatus in accordance with claim 4 wherein the at least one filter unit comprises two separating plates, whereby the sides of the separating plates contacting the at least one filter unit are turned towards one another, and wherein a filtrate plate is interposed between the separating plates to support the at least one filter unit and convey filtrate to said outlet port.

6. Apparatus in accordance with claim 5 wherein the separating plates are covered by inlet plates, said inlet plates having channels through which the liquid to be filtered is introduced into the separating plates.

7. Apparatus in accordance with claim 6 wherein the at least one filter unit comprises a plurality of filter units.

8. Apparatus in accordance with claim 1 or 2, wherein the at least one backflushable apparatus comprises a plurality of backflushable apparatus, means for conveying liquid to be filtered to the inlet of each said plurality of apparatus and means for conveying filtrate from each said plurality of apparatus to a common outlet port whereby the plurality of apparatus are connected in parallel.

* * * * *